(12) United States Patent
Bacchin

(10) Patent No.: US 11,602,035 B2
(45) Date of Patent: Mar. 7, 2023

(54) SWITCH WITH REMOTE CONTROLLED BACKLIGHTING

(71) Applicant: Iotty Srl, Porcia (IT)

(72) Inventor: Alberto Bacchin, Porcia (IT)

( * ) Notice: Subject to any disclaimer, the term of this patent is extended or adjusted under 35 U.S.C. 154(b) by 0 days.

(21) Appl. No.: 17/261,161

(22) PCT Filed: Jul. 22, 2019

(86) PCT No.: PCT/IB2019/056234
§ 371 (c)(1),
(2) Date: Jan. 18, 2021

(87) PCT Pub. No.: WO2020/021428
PCT Pub. Date: Jan. 30, 2020

(65) Prior Publication Data
US 2021/0282252 A1    Sep. 9, 2021

(30) Foreign Application Priority Data

Jul. 23, 2018   (IT) .......................... 102018000007451

(51) Int. Cl.
*H05B 45/20*   (2020.01)
*H01H 9/16*   (2006.01)
*H05B 47/19*   (2020.01)

(52) U.S. Cl.
CPC ............. *H05B 47/19* (2020.01); *H01H 9/161* (2013.01); *H01H 9/167* (2013.01); *H05B 45/20* (2020.01)

(58) Field of Classification Search
None
See application file for complete search history.

(56) References Cited

U.S. PATENT DOCUMENTS

| | | | |
|---|---|---|---|
| 9,389,769 B1 * | 7/2016 | O'Keeffe | G02B 6/0078 |
| 2016/0110154 A1 | 4/2016 | Qureshi | |
| 2017/0108236 A1 * | 4/2017 | Guan | G05B 19/042 |
| 2017/0273203 A1 | 9/2017 | Iaconis | |

* cited by examiner

Primary Examiner — Dedei K Hammond
(74) Attorney, Agent, or Firm — Themis Law

(57) ABSTRACT

A switch with backlight device, adapted to switch on internal or external lights and to be used for electrical outlets, heat regulators or for opening or closing doors and gates, includes lighting bodies and transparent sides configured to allow the passage of the light emitted by the lighting bodies toward the outside. The switch with backlight device is also provided with a wireless remote connection system suitable for the wireless remote connection of a mobile device, such as a mobile phone or a tablet, which is configured to transmit commands for switching on the backlight of the switch.

10 Claims, 2 Drawing Sheets

SWITCH WITH REMOTE CONTROLLED BACKLIGHTING

Figures 1A, 1B:
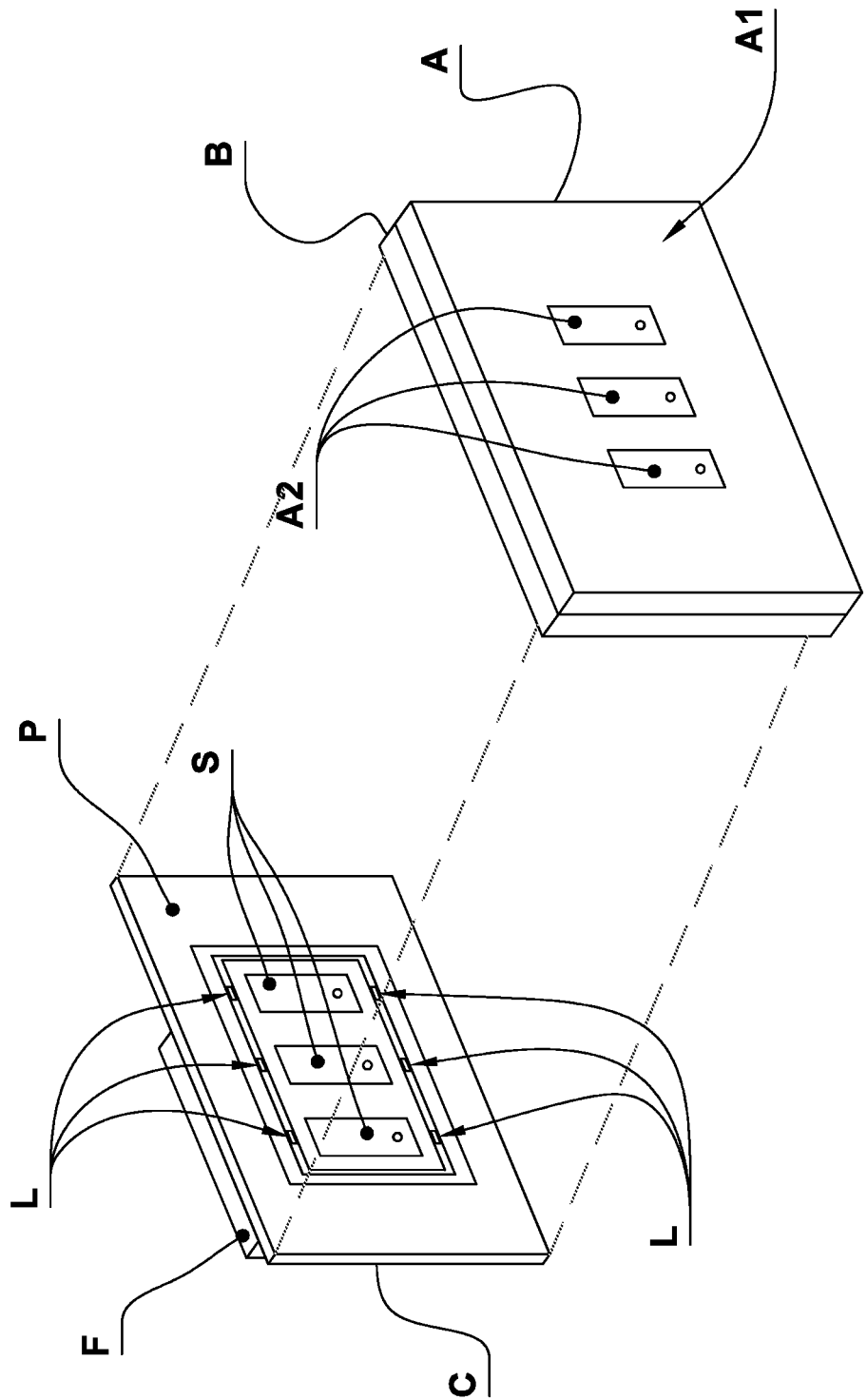

The present patent relates to switches, present in any type of building, for civil and industrial use, for internal or external lights, for electrical sockets, for thermostats or for opening or closing doors and gates or other electrical equipment for civil or industrial use.

The present art comprises various types of electro-mechanical switches and more recently the art comprises those equipped with various types of sensors, such as touch screens, which enable lights to be switched on or off, or doors and gates to be opened.

These switches can also include backlighting systems which help the user to identify the switch to be operated.

These backlighting systems are of particular interest to users due to their lighting effect which makes the interior of homes more pleasant.

At present it is not possible to control the switching on and off of these back-lighting devices, rather it is only possible to set them to constantly and repetitively switch on or off, with a consequent considerable waste of electricity, since the backlighting remains on even when the building is uninhabited.

The object of the new invention is a switch, comprising a back-lighting system, equipped with a wireless communication system such as for example WI-FI, Bluetooth, radio, or other equivalent devices, which enables the remote control of the relative commands and settings to switch on the backlight.

These backlighting switches comprise a box, generally fixed in the wall, suited to contain the various electrical wires.

A plate is fastened to this box, which serves as a support for the switch modules and to attach the plate with the relative indications of the switch positions. On the back of said plate there are one or more transparent flat elements that allow the light emitted by the internal lighting devices, generally LEDs, to be seen.

A switch module is present or applied on this plate, connected to the electrical wires supplying the system and the backlighting device.

One or more lighting devices, preferably LED devices, will be inserted on said switch module.

Said LED lighting devices will provide back-lighting for the switch through said transparent flat elements.

Said switches equipped with a backlighting system comprise one or more modules that can be operated with touch screen sensors.

Thus it will be sufficient to place a finger on or near said sensors to turn on the lighting switch of a room.

Said device for back-lighting the switches is operated through wireless devices, in particular using any type of mobile device equipped with wireless technology as the interface (for example a mobile phone, computer or tablet).

It will therefore be possible to easily control said back-lighting devices via a mobile phone or tablet, and even select the preferred settings.

Thanks to this lighting device for switches, it will therefore be possible to decide at what times of the day the backlighting system should be on or off.

Thanks to these back-lighting switches, it will also be possible to select the color of the backlighting itself, or even possible flashing effects.

Thanks to said backlighting switches, it will also be possible to configure the back-lighting system to switch on every time someone enters the room with the corresponding wireless device. The backlighting device will communicate with the corresponding wireless device, which will signal the presence in the room and will give the command to switch the backlighting system on.

It will also be possible to set up a connection with the cloud of the mobile device, so as, for example, to order the backlighting system to turn on at scheduled times, for example from sunset to sunrise, or on overcast days, all through the cloud system that will have access to relevant information such as the weather and the exact time of sunset and sunrise.

Said backlighting device present in the switches in question may also be operated even with a gesture of a hand thanks to vicinity sensors.

Said backlighting system in said switches may also provide intermittent illumination, that is, a flashing effect.

These switches equipped with backlighting devices may be given many other commands and settings from the cloud of the mobile device and through a wireless connection, such as for example, to turn on the backlighting on particular pre-established occasions, for example birthdays, Christmas holidays, etc.

These switches equipped with backlighting devices can be used to indicate the arrival of a phone call on a mobile device, preventing the user from being disturbed by the phone ringing, and being alerted instead through the backlighting which may for example start blinking.

Said backlighting switches may also be activated in the event the alarm system is activated and therefore as a result of the presence of an intruder inside the property.

In addition to the switches, said backlighting system can also be combined with sockets and therefore control the backlighting through a wireless connection with the corresponding mobile device.

A practical embodiment of the invention is presented, by way of a non-limiting example, in the attached drawings.

FIG. 1a shows a front view of the plate (A) provided with an opaque surface (A1) where the transparent elements (A2) are located to create the contact or proximity zones with switching functions. Behind said plate (A) there is a flat body made of a transparent material (B) or in any case suited to enable the backlighting effect.

FIG. 1b shows the body (C), to be fastened to the box, provided with a flat wall (P) on its front side which serves as the switch plate on which the switch modules (F) are directly or indirectly applied and comprising the related sensors (S) to open and close the room's lighting circuit. In particular, in this case the backlighting devices comprise six LEDs (L) placed in a position behind the front plate (A) suited to be inserted in or adhere to the transparent element (B) integral with the plate (A). In addition to the LEDs (L), the figure shows the touch screen sensors (S).

Figure 2:
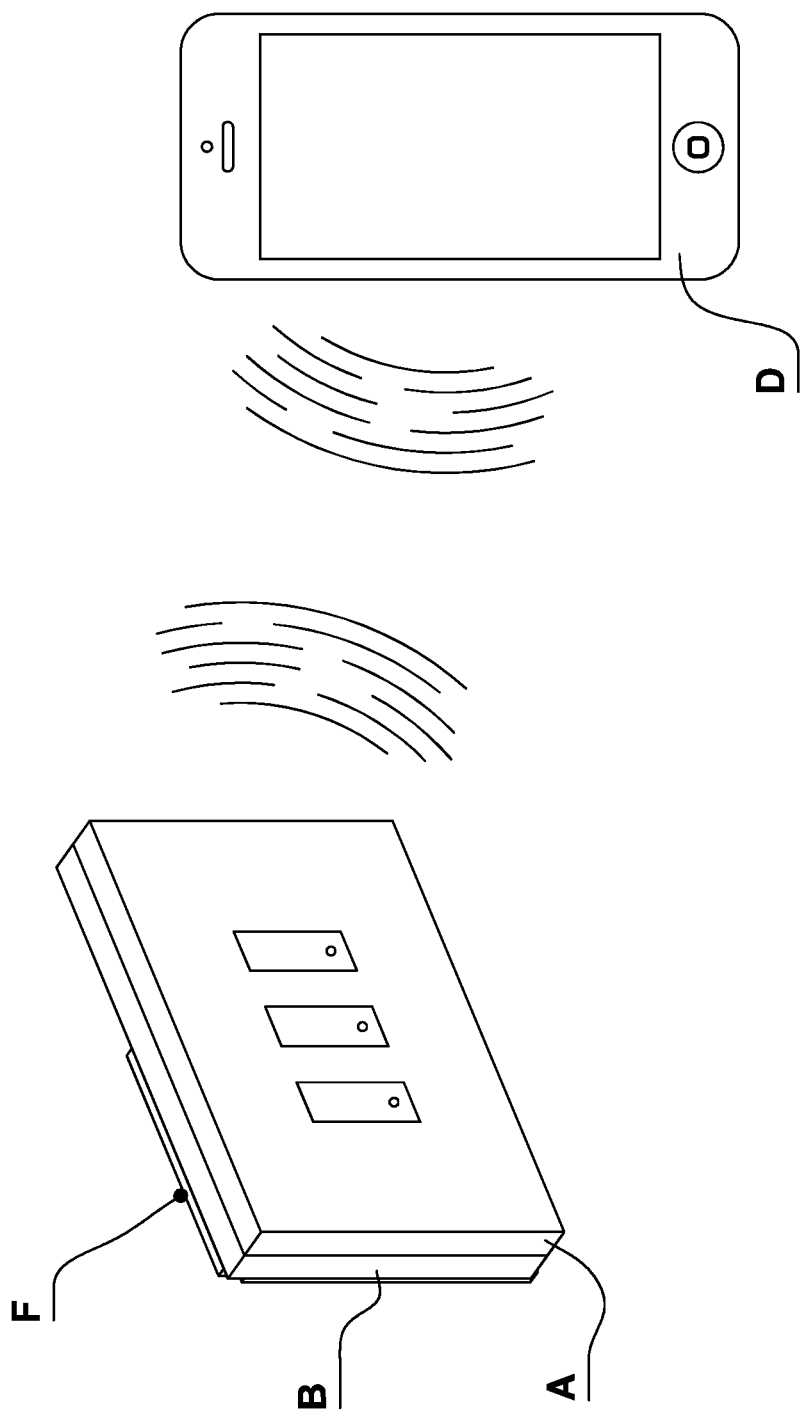

FIG. 2 illustrates a wireless connection with a mobile phone (D).

These specifications are sufficient for the expert person to make the invention, as a result, in the practical application there may be variations without prejudice to the substance of the innovative concept.

Therefore, with reference to the preceding description and the attached drawings the following claims are made.

The invention claimed is:

1. A switch with backlight device, adapted to switch on internal or external lights and to be used for electrical outlets, heat regulators, or for opening or closing doors and gates, comprising:

an opaque front cover having one or more transparent portions defined therein, the one or more transparent portions being contact or proximity zones providing switching capabilities;

a transparent flat body disposed behind the opaque front cover;

a rear body comprising,
- one or more sensors disposed so as to be actuated by contact on the one or more transparent portions, and
- one or more lighting bodies disposed behind the opaque front cover, so as to cause light to be emitted toward an outside from all side edges of the transparent flat body; and a wireless remote connection system suitable for a wireless remote connection with a mobile device, wherein said mobile device is designed to transmit commands for switching on remotely a backlighting of the backlight device.

2. The switch with backlight device according to claim 1, wherein said mobile device is connected to a cloud and is configured to transmit commands directly from the cloud to the switch with backlight device.

3. The switch with backlight device according to claim 1, wherein the one or more transparent portions and one or more sensors operate as touch screen switches.

4. The switch with backlight device according to claim 3, wherein said switch is configured to turn on said lighting bodies by passing a hand near said touch screen switches.

5. The switch with backlight device according to claim 1, wherein the lighting bodies are LED lighting bodies.

6. The switch with backlight device according to claim 1, wherein said lighting bodies are configured to transmit light in several colors or shades.

7. The switch with backlight device according to claim 1, wherein said switch is configured to emit a backlight that is intermittent or programmed with various lighting sequences.

8. The switch with backlight device according to claim 1, wherein said wireless remote connection system is of a WI-FI or Bluetooth type, or a radio device, or a combination thereof.

9. The switch with backlight device according to claim 1, further comprising one or more electrical outlets.

10. The switch with backlight device according to claim 1, wherein said mobile device is designed to transmit the commands for switching on remotely the backlighting of the backlight device upon a user entering a predetermined area where the backlight device is located.

\* \* \* \* \*